United States Patent [19]

Abidaud

[11] Patent Number: 5,110,578

[45] Date of Patent: May 5, 1992

[54] CONTINUOUS PRODUCTION OF POTASSIUM NITRATE VIA ION EXCHANGE

[75] Inventor: Alvaro Abidaud, Barranquilla, Colombia

[73] Assignee: Monomeros Colombo Venezolanos, S.A. (E.M.A.), Barranquilla, Colombia

[21] Appl. No.: 592,030

[22] Filed: Oct. 3, 1990

[30] Foreign Application Priority Data

Oct. 5, 1989 [CC] 10051989 .................................. 311079

[51] Int. Cl.$^5$ .............................................. C01D 9/00
[52] U.S. Cl. .................................... 423/202; 423/181; 423/194; 423/390; 423/395; 423/399
[58] Field of Search ................ 423/181, 202, 179, 194, 423/390, 395, 399

[56] References Cited

U.S. PATENT DOCUMENTS

| | | | |
|---|---|---|---|
| 2,963,345 | 12/1960 | Smith et al. | 423/398 |
| 3,645,673 | 2/1972 | Labriola et al. | 423/395 |
| 3,983,222 | 9/1976 | Lehto | 423/395 |
| 4,378,342 | 3/1983 | Manner et al. | 423/390 |
| 4,465,568 | 8/1984 | Dotson et al. | 204/98 |
| 4,481,112 | 11/1984 | Hitzel | 210/620 |
| 4,522,726 | 6/1985 | Berry et al. | 210/660 |
| 4,548,717 | 10/1985 | Kunin et al. | 210/670 |
| 4,668,495 | 5/1987 | Portela | 423/390 |
| 4,695,386 | 9/1987 | Berry | 210/665 |
| 4,695,387 | 9/1987 | Berry et al. | 210/676 |
| 4,704,262 | 11/1987 | Berry | 423/310 |
| 4,704,263 | 11/1987 | Berry et al. | 423/312 |
| 4,707,347 | 11/1987 | Vajna et al. | 423/552 |
| 4,710,364 | 12/1987 | Berry | 423/244 |
| 4,724,082 | 2/1988 | Boom | 210/679 |
| 4,734,200 | 3/1988 | Wes Berry | 210/677 |
| 4,764,276 | 8/1988 | Berry et al. | 210/264 |
| 4,778,492 | 10/1988 | Dawson | 55/78 |

OTHER PUBLICATIONS

R. Norris Shreve et al., *Chemical Process Industries,* Fourth Edition, McGraw-Hill Book Company, pp. 272-273.
"Weak-Acid Cation Exchange Resins," Diamond Shamrock Technical Bulletin, p. 2.
"Dowex Monosphere* 650C Cation Resin," The Dow Chemical Company, form No. 177-1406-88 AMS.

*Primary Examiner*—Theodore Morris
*Assistant Examiner*—Edward Squillante
*Attorney, Agent, or Firm*—Mason, Fenwick & Lawrence

[57] ABSTRACT

Potassium nitrate is produced by contacting nitric acid with a potassium loaded strong cationic exchange resin. In a preferred embodiment, a solution of potassium nitrate and dilute nitric acid is produced in a continuous liquid solid contacting apparatus. The preferred apparatus is formed of a plurality of resin filled chambers which rotate in and out of periodic fluid communication with fixed feed and discharge ports. The apparatus design allows for continuous supply of a nitric acid solution, potassium chloride regeneration solution, wash solutions, and air streams to ports arranged in zones, so that resin filled chambers pass through the zones to continuously produce a solution containing potassium nitrate and dilute nitric acid. In a preferred embodiment, the solution of potassium nitrate produced is neutralized with potassium hydroxide to convert residual nitric acid to potassium nitrate.

14 Claims, 8 Drawing Sheets

FIG. I

CONTINUOUS PRODUCTION OF POTASSIUM NITRATE VIA ION EXCHANGE

FIELD OF THE INVENTION

This invention is directed to methods for producing potassium nitrate generally, and more particularly to methods for producing potassium nitrate via ion exchange, and to apparatus capable of producing potassium nitrate via ion exchange on a continuous basis.

BACKGROUND OF THE INVENTION

Potassium nitrate, otherwise known as saltpeter or nitrate of potash, is important in the production of fertilizers, explosives, glass, and numerous other industrial chemicals. It is one of the oldest known "industrial" chemicals. Potassium nitrate has been used on a large scale since around the year 1300, when the Chinese discovered that saltpeter could be combined with sulfur and charcoal to produce the common explosive known as black powder.

The ever growing demand for potassium nitrate for these and other such uses has resulted in a prolonged search for improved potassium nitrate production processes, and various methods have been invented to produce potassium nitrate. For example, large quantities of potassium nitrate are commercially produced by the reaction of potassium chloride with nitric acid in the presence of oxygen, yielding the following overall reaction:

$$2KCl + 2HNO_3 + \tfrac{1}{2} O_2 \rightarrow 2KNO_3 + Cl_2 H_2O.$$

The potassium chloride and nitric acid must be reacted at 100° C. to produce potassium nitrate, nitrosyl chloride and water as follows:

$$3KCl + 4HNO_3 \rightarrow 3KNO_3 + NOCl + Cl_2 + 2H_2O.$$

The nitrosyl chloride is then oxidized to chlorine and nitrogen peroxide, $NO_2$, with nitric acid. See *Chemical Process Industries*, 4th Ed., Shreve and Brink, McGraw-Hill, Inc., New York (1977), pp. 272-273.

Smith et al, in U.S. Pat. No. 2,963,345, herein incorporated by reference, disclose a process for producing potassium nitrate, which involves agitating solid particulate potassium chloride with liquid nitrogen peroxide under anhydrous conditions at a temperature of 15° C.; excess nitrosyl chloride vapors produced by the reaction are continuously withdrawn to maintain the reaction. Potassium nitrate and unreacted potassium chloride are then separated by addition to a brine that contains dissolved potassium nitrate and potassium chloride; the brine solution is heated to about 85° C. to dissolve the potassium nitrate, but not the solid particles of potassium chloride. The solid particles of potassium chloride are then separated by filtration.

Large volumes of potassium nitrate are also produced by the reaction of sodium nitrate with potassium chloride, the overall reaction being:

$$KCl + NaNO_3 \rightarrow KNO_3 + NaCl.$$

This process requires that potassium chloride be dissolved in a hot solution of sodium nitrate; upon heating, sodium chloride crystals are formed. The hot potassium nitrate solution is then run through the sodium chloride crystals forming at the bottom of the reaction vessel. However, a mixture of potassium nitrate and sodium chloride is formed, so additional processing operations are required to separate potassium nitrate.

Lehto, in U.S. Pat. No. 3,983,222, herein incorporated by reference, discloses a continuous process for producing potassium nitrate, which includes the steps of extracting nitrate from aqueous solutions with an organic amine salt dissolved in an organic solvent, separating the organic phase containing the extracted nitrate from the aqueous phase, and stripping the organic base with a potassium salt stripping solution having a pH of at least 0.5. The stripping solution also contains nitrate ions and potassium ions with the concentration of potassium nitrate maintained high enough to induce crystallization of potassium nitrate from the stripping solution continuously.

Dotson et al, U.S. Pat. No. 4,465,568, herein incorporated by reference, uses an electrolytic process to produce chloride free mixtures of sodium nitrate and potassium nitrate.

All of the prior art processes for producing potassium nitrate are expensive or difficult to perform. Processes that utilize nitric acid at elevated temperatures require specially constructed equipment to handle the highly corrosive reactants, and further, elevated reaction temperatures require high energy inputs. Other prior art processes suffer from low yields of potassium nitrate or an impure product, while others involve the use or production of nitrogen peroxide, which is toxic, and poses a pollution problem.

Thus, there is a need for an inexpensive and continuous process for producing large quantities of potassium nitrate at ambient temperatures. There is also a need for a potassium nitrate production process which does not corrode reaction vessels, and thereby require expensive corrosion resistant construction materials. Further, there is a need for a safe potassium nitrate production process which produces by-products which are easy to handle, and dispose of.

Reaction of potassium chloride with nitric acid to produce potassium nitrate via ion exchange has not been attempted, since a potential hazard exists in the use of nitric acid in ion exchange operations. There have been several accidents involving the use of nitric acid as a regenerant or elution agent with ion exchange resins. Nitric acid is a powerful oxidizing agent, and the reaction of nitric acid with organic ion exchange resins can result in a serious fire or explosion. Further, while the use of dilute solutions of nitric acid may reduce the risk of explosion or fire, the presence of metals, such as copper, and absorbed organic solutes in any system containing nitric acid can catalyze an uncontrolled reaction. Even in dilute solutions, nitric acid is believed to have a negative effect on the useful life of exchange resins.

At dilute nitric acid concentrations, larger volumes of resin are needed, with the resulting increase in cost, without a substantial decrease in the perceived potential for a fire or explosion. The necessity of using large volumes of expensive resin to achieve reasonable yields of product further discouraged the use of ion exchange to produce potassium nitrate.

The production of potassium nitrate by passing a neutral nitrate salt through a cationic exchange resin was also not believed practical, since cationic exchange resins have an equal affinity for potassium and other monovalent ions. Divalent ions, such as calcium, make regeneration of such a column difficult, since large quantities of potassium are necessary to displace calcium bound to the resin. Yet, provided the aforementioned problems can be overcome, production of potassium nitrate via ion exchange offers a simple, low cost and efficient alternative to the prior art methods.

OBJECTS OF THE INVENTION

Thus, it is a primary object of the present invention to provide an inexpensive and simple method for producing potassium nitrate via ion exchange at ambient temperatures.

It is a further object of the present invention to provide a method for producing potassium nitrate from potassium chloride and nitric acid via ion exchange on a continuous basis.

It is yet another object of the present invention to provide an apparatus, and method for using the same, to safely produce potassium nitrate via ion exchange from potassium chloride and nitric acid feed solutions on a continuous basis, without producing or using dangerous and/or highly corrosive reactants or reaction conditions.

SUMMARY OF THE INVENTION

These and other objects of the present invention are achieved by passing a solution of nitric acid through a potassium loaded strong cationic exchange resin to produce potassium nitrate. In a preferred embodiment, a fifteen per cent by weight nitric acid solution (15% wt $HNO_{3(aq)}$) is passed through a potassium loaded strong cationic exchange resin to produce a solution of about fifteen per cent by weight potassium nitrate (15% wt $KNO_{3(aq)}$) and about 0.5 per cent by weight of nitric acid; the solution of potassium nitrate and nitric acid is subsequently neutralized with potassium hydroxide (KOH) to produce a substantially pure aqueous solution of potassium nitrate. High purity solid potassium nitrate ($KNO_{3(s)}$) can then be produced by standard crystallization methods.

In a preferred embodiment, potassium nitrate is produced continuously through the use of a modified advanced separation device, ASD, such as that described in Berry et al U.S. Pat. Nos. 4,764,276 and 4,522,726, and herein incorporated by reference. Preferably the ASD is modified to include thirty chambers, which are filled with a cationic exchange resin, and which rotate about a circular path in periodic fluid communication with a series of fixed feed and discharge ports connected to opposite ends of the chambers.

Preferably, the feed ports and chambers are arranged so that each of the chambers is in fluid communication with no more than one feed port at a time, and each of the feed ports is in communication with at least one of the chambers at all times. The discharge ports are purposely arranged so that each of the chambers is in fluid communication with no more than one discharge port at a time, and each of the discharge ports is in communication with at least one of the chambers at all times.

Preferably, a first feed port directs a continuous supply of a fifteen per cent by weight nitric acid solution, or first solution, into the rotating resin filled chambers in fluid communication therewith. Hydrogen ions are exchanged with potassium ions bound to the resin to produce a second solution of potassium nitrate and dilute nitric acid. The second solution flows into a first discharge port, which is in fluid communication with the resin filled chambers in communication with the first feed port; the second solution from the first discharge port is then directed to an adjacent second feed port. The second solution is then passed through the resin in the chambers which are adjacent to the chambers supplied with the first solution, and flows out of the adjacent second discharge port. The second solution flowing from the second discharge port has a higher concentration of potassium nitrate and a lower concentration of nitric acid than the second solution flowing from the first discharge port.

The second solution from the second discharge port is then directed into a third feed port, through the resin in the chambers which are adjacent to the chambers communicating with the second feed and discharge port, and flows out of a third discharge port. The second solution flowing from the third discharge port is then directed to an adjacent fourth feed port, through the resin in the chambers filled with potassium loaded strong cationic exchange resin, and flows continuously out of a fourth discharge port. The solution of potassium nitrate and dilute nitric acid leaving the fourth discharge port is then neutralized with potassium hydroxide to convert the remaining nitric acid to potassium nitrate.

Preferably, the direction of flow of the first and second solutions is counter-current to the direction of motion of the rotating resin filled chambers. Thus, chambers, filled with fresh potassium loaded strong cationic exchange resin, are first contacted with the second solution which is fed through the fourth feed port. Subsequently, the potassium loaded resin is sequentially subjected to the second solution fed from the third and second feed ports, with the second solution being fed to the chambers progressively having a higher nitric acid content and a lower potassium nitrate concentration.

Thus, the potassium loaded resin will have been partially converted to its hydrogen loaded or acid form when it is contacted with the first solution of nitric acid provided by the first feed port. The resin in the chambers communicating with the first feed port is substantially converted from the potassium loaded form to the hydrogen loaded form by contact with the first solution of nitric acid.

The chambers moving from fluid communication with the first feed port are subsequently moved into fluid communication with a series of four wash water feed ports. The rotating resin filled chambers are first moved sequentially into fluid communication with the last, or eighth feed port, of the four ports fed with wash water. The wash water is initially fed to a fifth feed port, flows through the resin filled chambers in fluid communication therewith, exits a fifth discharge port, is directed into a sixth feed port, and so on, until the wash water containing the highest concentration of potassium nitrate and nitric acid flows from the eighth feed port continuously. Thus, the fifth feed port directs substantially pure deionized water through the hydrogen loaded resin to remove any residual potassium nitrate and nitric acid on the resin in the chambers rotating into and out of fluid communication therewith. The "cleanest" wash water is used on the "cleanest" resin last, while the "dirtiest" wash water is used on the "dirtiest" resin first. In a preferred process, the dilute wash solution of potassium nitrate an nitric acid leaving the eighth discharge port is used to dilute a fifty-two per cent by weight nitric acid solution to form a fifteen per cent by weight nitric acid solution, which is fed to the first feed port.

The resin filled chambers containing washed hydrogen loaded resin are then sequentially moved into and out of fluid communication with a ninth feed port, which is fed a continuous stream of air. The air forces out any residual wash water on the resin in the chambers in communication with the ninth feed port. The resin filled chambers are then sequentially moved into and out of communication with six feed ports supplying a third solution of potassium chloride, or a fourth solution of potassium chloride and hydrochloric acid; the fourth solution is produced by the conversion of the hydrogen loaded resin to the potassium loaded form.

Preferably, the third solution contains about ten to twelve per cent by weight potassium chloride, and is fed into a tenth and an eleventh feed port. The fourth solution produced in the chambers communicating with the tenth and eleventh feed ports is then directed from the tenth and eleventh discharge ports into twelfth and thirteenth feed ports, and subsequently from twelfth and thirteenth discharge ports to fourteen and fifteenth feed ports. Chambers filled with hydrogen loaded resin moving from communication with the ninth feed port, or air injection port, are first moved into and out of communication with the fifteenth feed port, and are sequentially moved into and out of fluid communication with the fifteenth, fourteenth, thirteenth, twelfth, eleventh and tenth feed ports.

The chambers containing potassium loaded resin are then sequentially moved into and out of fluid communication with four wash water feed and discharge ports, referred to as the sixteenth, seventeenth, eighteenth and nineteenth feed and discharge ports. Wash water fed to the sixteenth feed port is sequentially fed from the sixteenth discharge port through the adjacent chambers via the seventeenth, eighteenth and nineteenth feed ports. Wash water fed to the sixteenth feed port is deionized, and substantially pure, while wash water entering the nineteenth feed port contains potassium chloride and hydrochloric acid rinsed from resin in the preceding chambers. The wash water leaving the nineteenth discharge port is preferably used to dilute incoming concentrated potassium chloride solutions, or it can be neutralized and disposed of.

A twentieth feed port directs air into chambers moving from communication with the sixteenth feed port, and forces wash water from the resin.

Thus, in the preferred apparatus, each resin filled chamber is sequentially subjected to feed solutions of nitric acid, wash water, air, potassium chloride, wash water, and air.

DETAILED DESCRIPTION OF THE INVENTION

Figure 1:
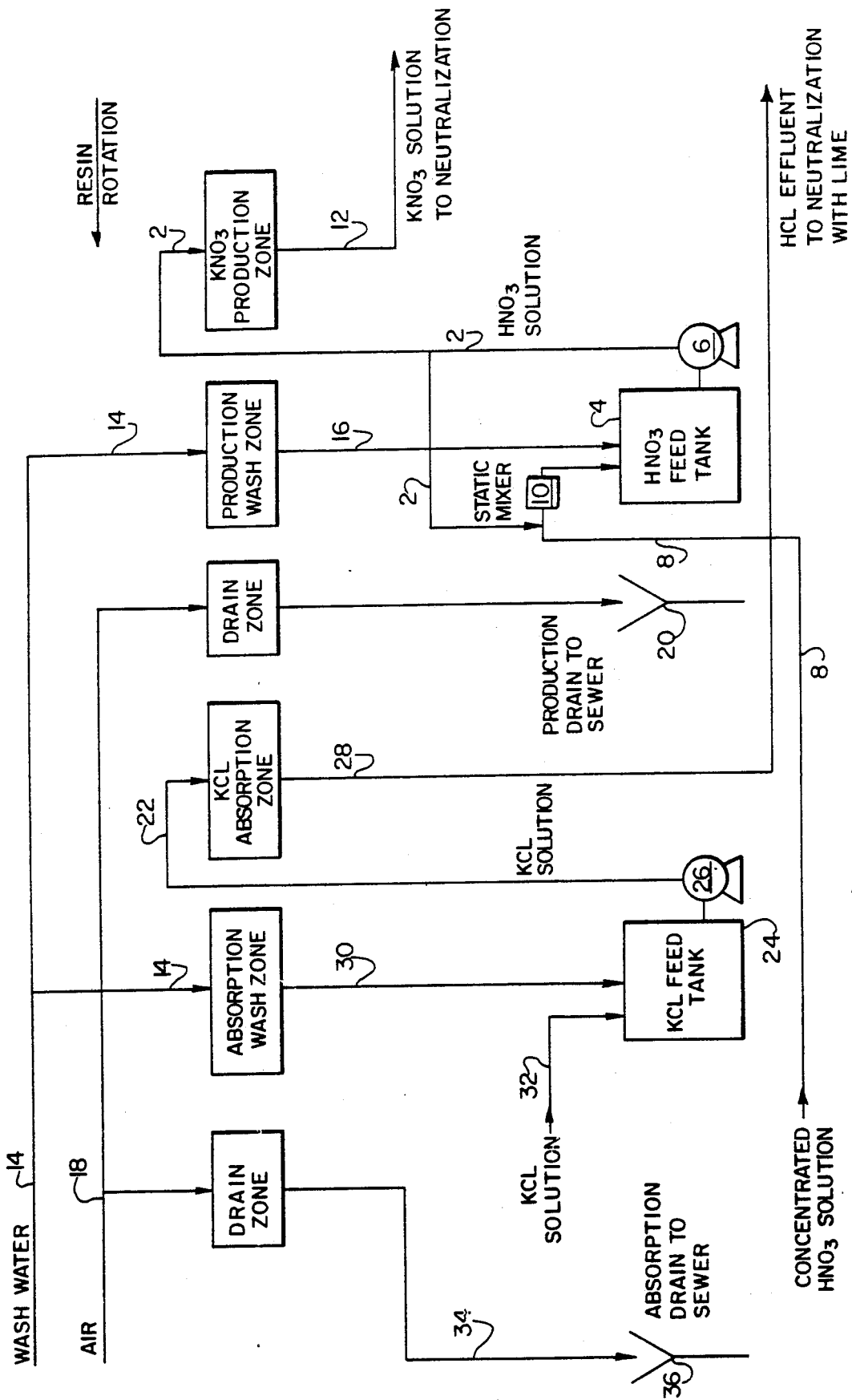
FIG. 1 is a block diagram illustrating the process of the present invention.

The advanced separation device, ASD, disclosed in U.S. Pat. Nos. 4,765,276 and 4,522,726, has been used in various configurations, and with numerous starting materials to produce valuable products on a small scale. For example, Berry et al, in U.S. Pat. No. 4,704,263, disclose the production of potassium phosphates by ion exchange using the ASD. The process involves passing a phosphate salt solution through a cation exchange resin loaded with potassium to form potassium phosphate, and after washing out residual salts, regenerating the cation exchange resin by addition of a potassium salt. Preferably, the potassium salt is potassium chloride and the ion exchange resin is a strong cation exchange resin. Phosphoric acid was not directly applied to the potassium loaded cation exchange resin to produce potassium phosphate.

In related U.S. Pat. No. 4,704,262, Berry discloses the use of the ASD to produce dialkali metal phosphates by ion exchange. The process involves passing an ammoniated phosphate solution through a weak cation exchange resin and the alkaline metal formed, so that the ammonium is exchanged with the alkaline metal to produce an ammonium loaded resin and a dialkali metal phosphate. In particular, the ammoniated phosphate solution is prepared by reacting ammonium with a water soluble phosphorus source, such as monocalcium phosphate or phosphoric acid, and the alkali metal salt is potassium sulfate, potassium chloride, sodium sulfate, sodium chloride, or sodium carbonate.

It was desired to use the ASD in a similar fashion to Berry et al. to produce potassium nitrate via ion exchange. Since addition of nitric acid to a cation exchange resin was known to be dangerous, initial experiments involved the conversion of neutral nitrate salts to potassium nitrate via ion exchange.

Experiments were performed to determine if calcium nitrate could be converted to potassium nitrate by passage of a calcium nitrate solution through a potassium loaded strong cation exchange resin. The overall reaction is:

About ninety-five per cent of the calcium bound to the resin, but about five per cent calcium nitrate remained combined with the potassium nitrate produced. The calcium nitrate is difficult to separate, requiring substantial additional effort and expense to produce pure potassium nitrate. Further, upon attempting to regenerate the column from its calcium loaded form to its potassium loaded form, the exchange capacity of the resin was substantially reduced. Thus, the following reaction proceeded to the right only about sixty per cent:

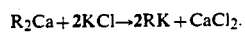

Attempts to pass sodium nitrate solutions through a potassium loaded column were discouraged because of the difficulty in obtaining high yields of potassium nitrate. Further, it was believed that the potassium nitrate produced would be mixed with large amounts of sodium nitrate. Finally, sodium nitrate is expensive in relation to other feed materials such as calcium nitrate, indicating that the process would be expensive as well as inefficient.

While it was believed that addition of nitric acid to a strong cationic exchange resin might pose a fire or explosion hazard, or could cause a substantial reduction in the useful life of the ion exchange resin used, the failure in the earlier experiments to produce a viable potassium nitrate ion exchange production method left a need for a better method for producing potassium nitrate. Thus, additional experiments were performed, in which a single fixed column was filled with a potassium loaded strong cationic exchange resin, sold under the trade name DOWEX MONOSPHERE TG650C, (sulfonated polystyrene-divinylbenzene copolymer) and a dilute solution of nitric acid was passed through the resin. Surprisingly, the exchange capacity and appearance of the resin did not appear to be negatively affected by the nitric acid, and high yields of potassium nitrate resulted. Despite predictions that nitric acid would decay the resins used, surprisingly, there was no resin decay noted, and consequently resin decay products were not noted in the potassium nitrate produced. Further, over the course of multiple experiments with dilute nitric acid, no fire or explosion occurred. Therefore, it was discovered that potassium nitrate could be produced easily and at room temperature by passing nitric acid through a potassium loaded strong cationic exchange resin.

Use of a single fixed bed exchange column required a large amount of resin in order to achieve greater than ninety-five per cent conversion of nitric acid to potassium nitrate. In order to produce pure potassium nitrate, it is necessary to neutralize the excess nitric acid with potassium hydroxide. Since potassium hydroxide is relatively expensive, the competitive advantage of producing potassium nitrate via ion exchange is substantially reduced by the increased costs involved in the purchase of large volumes of exchange resin to increase column yields, or the purchase of large volumes of potassium hydroxide to neutralize excess nitric acid.

Further, fixed bed exchange columns are not very efficient, since the ion exchange process cannot be carried out continuously. The flow of materials to the fixed bed must be frequently interrupted so the resin can be regenerated. Further, a large amount of resin is wasted in fixed bed columns since the exchange zone in the fixed bed is relatively small compared to the size of the column bed. Finally, as the exchange zone nears the bottom of a column bed, the concentration gradient between the potassium ions bound to the resin and the hydrogen ions in the nitric acid feed solution has substantially diminished, which results in a reduction in the exchange efficiency.

The surprising discovery that potassium nitrate could be produced by passing a nitric acid solution through a potassium loaded strong cation exchange resin, without causing a fire or explosion, or rapidly decomposing the resin, suggested that the success of Berry et al in applying the ASD to small scale production of alkali metal phosphates, such as potassium phosphate, may possibly serve as a model to produce potassium nitrate via ion exchange. Early experiments with a laboratory scale ASD or ion separation exchange process (ISEP) system produced by Advanced Separation Technologies. Inc. of Lakeland. Fla., were very successful: high yields of potassium nitrate were produced on a continuous basis from continuous flows of nitric acid. potassium chloride, and wash water.

Therefore, an industrial scale ASD. or ISEP. was constructed. The industrial scale ASD was essentially an enlarged version of the laboratory scale ASD. However, the industrial scale ISEP leaked so severely upon pressurization of the feed solutions, that it was not possible to use the apparatus effectively. Therefore, a critical valve, to be described in more detail later hereinbelow, was redesigned, and successfully tested; this resulted in a modified ASD capable of producing over 5000 tons per year of potassium nitrate from continuous supplies of nitric acid and potassium chloride.

With reference to FIG. 1, a block diagram illustrating the overall process of the present invention is provided. The resin filled chambers of the ASD apparatus are represented in FIG. 1 by different zones. In practice, each of the resin filled chambers is cyclically passed through the different zones. Resin filled chambers passing through the potassium nitrate production zone are filled with resin in the potassium loaded form, and a dilute nitric acid solution 2 is passed through the resin. The nitric acid solution 2 is drawn from tank 4 by pump 6. The nitric acid solution 2 in tank 4 is provided by combining a concentrated nitric acid source 8 with production wash water. A portion of the dilute nitric acid 2 is combined with concentrated nitric acid solution 8 at static mixer 10. This ensures that a homogeneous nitric acid solution 2 is provided to the potassium nitrate production zone. Preferably, the nitric acid is obtained as a fifty-two per cent by weight solution, and diluted to approximately fourteen to sixteen per cent by weight nitric acid before it is pumped into the ASD.

It has been discovered that use of nitric acid at a lower concentration reduces the risk of fire or explosion, as well as reduces or substantially eliminates fast decomposition of the resin matrix. It is preferred that the nitric acid used be diluted below twenty-three per cent; at higher concentrations, clogging of the columns was noted, which is believed to be due to precipitation of nitrate salts in the resin chambers.

The potassium nitrate solution 12 leaving the potassium nitrate production zone preferably contains about fifteen per cent by weight potassium nitrate and about 0.5 per cent by weight nitric acid. Preferably, this concentration of residual nitric acid is neutralized with potassium hydroxide. The amount of potassium hydroxide used to neutralize the excess nitric acid is preferably small enough to make the present process economically competitive with the prior art processes for producing potassium nitrate.

The chambers leaving the potassium nitrate production zone then pass to a potassium nitrate production wash zone. Wash water 14 is continuously passed through the resin in the chambers passing through the production wash zone to carry away residual potassium nitrate and nitric acid remaining on the resin. The effluent 16 from the production wash zone is directed to tank 4.

Chambers passing from the production wash zone then pass to the drain zone, where air from air source 18 forces any residual wash water from the resin in the chamber to prevent cross zone contamination. Preferably, the water drained from the resin is directed to a sewer 20, after any necessary environmental treatment steps are performed.

Preferably, the wash water 14 is deionized. Chambers leaving the drain zone which follows the production wash zone, then enter a potassium chloride adsorption zone. The resin, which has been converted in the potassium nitrate production zone to its hydrogen loaded or acid form, is regenerated to its potassium loaded form in the potassium chloride adsorption zone. A potassium chloride solution 22 is drawn from a tank 24, and fed by pump 26 into the chambers passing through the potassium chloride adsorption zone. Preferably, the potassium chloride feed solution 22 is diluted in feed tank 24 to approximately a ten to fourteen per cent by weight solution of potassium chloride with adsorption wash water exiting the potassium chloride adsorption zone. The exchange of potassium ions for hydrogen ions bound to the resin in the potassium chloride adsorption zone results in the production of hydrochloric acid. Preferably, the hydrochloric acid effluent 28 can be used in other chemical processes, or neutralized with lime before disposing of the solution.

Chambers leaving the potassium chloride adsorption zone are then passed to an adsorption wash zone. Wash water 14 is passed through the chambers in the adsorption wash zone to remove residual potassium chloride and HCl. The effluent 30 from the adsorption wash zone is preferably combined in feed tank 24 with the concentrated KCl feed solution 32; this increases the efficiency of both KCl and water use. Finally, chambers leaving the adsorption wash zone enter a drain zone where air 18 forces any remaining water on the potassium loaded resin out of the chambers to prevent cross zone contamination. The air and water mixture 34 are forced from the chambers to a drain or sewer 36.

Figure 2:
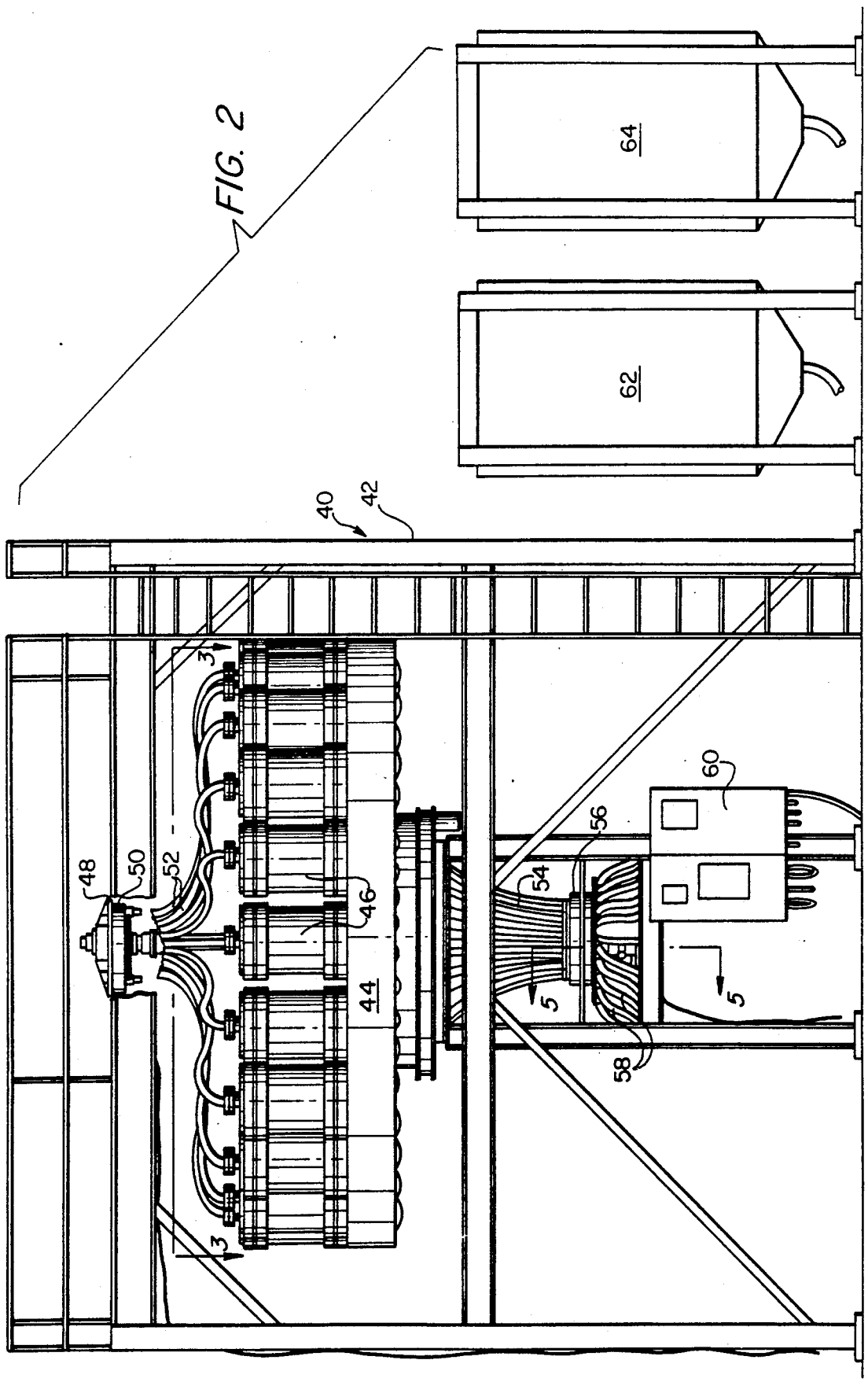
FIG. 2 is a front elevation view, with parts broken away, of the preferred apparatus for performing the method of the present invention.

Referring now to FIG. 2, there is shown a preferred apparatus 40 for continuously producing potassium nitrate via ion exchange in accordance with the herein disclosed method. Apparatus 40 is positioned within an access framework 42, and comprises a disc-shaped rotating carousel 44, which supports a plurality of chambers 46, some of which are at the periphery of the disc-shaped rotating carousel 44. A plurality of generally radially arranged feed hoses 48 deliver liquids to a feed distribution valve 50, and feed hoses 52 conduct liquids from the valve 50 to the chambers 46. Hoses 54 deliver liquids from the chambers 46 to a discharge distribution valve 56, and hoses 58 conduct liquids from the discharge distribution valve 56. In a preferred embodiment, there are thirty chambers 46, the same number of feed hoses 52 and the same number of hoses 54. There are twenty of the feed hoses 48 and twenty of the hoses 58. As will be explained hereinbelow, some of the hoses 58 will be the same as or are connected to some of the feed hoses 48, to effect recycling of discharge liquid.

A control apparatus 60 is provided, and includes monitoring and control devices and circuits for operating the apparatus 40 on a continuous basis. Also shown in FIG. 2 are storage tank 62 for aqueous potassium chloride and storage tank 64 for nitric acid; tanks 62 and 64 are each connected by hoses to one of the feed lines 48.

Figure 3:
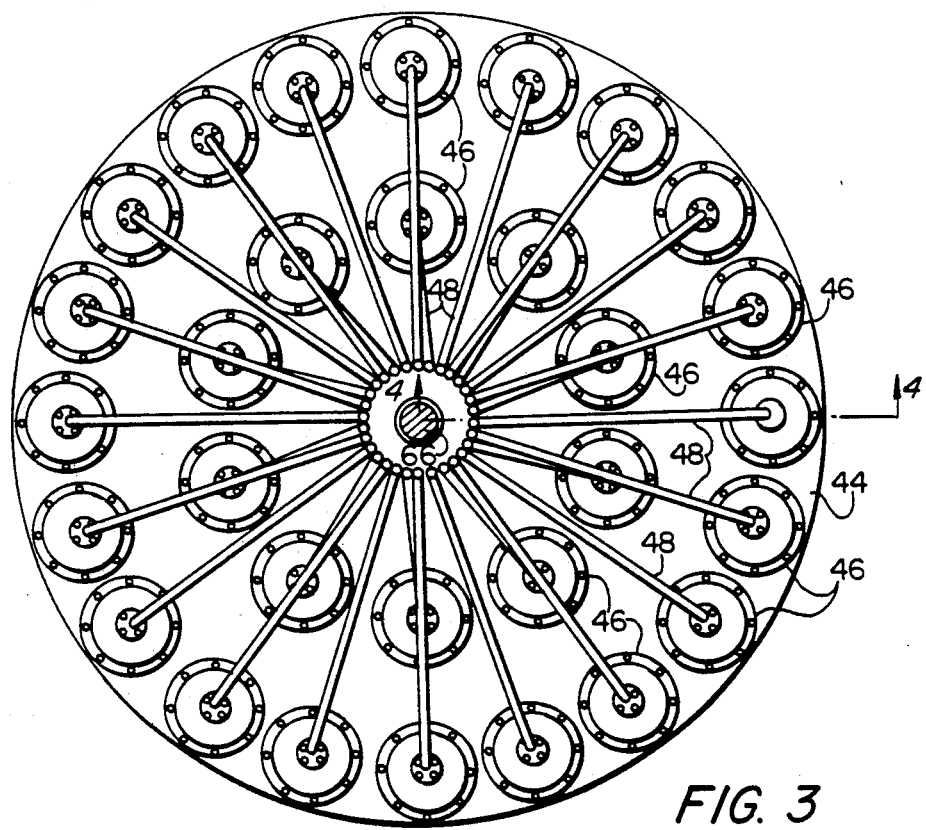
FIG. 3 is a cross-sectional view taken along line 3—3 of FIG. 2.

FIG. 3 shows carousel 44 with chambers 46 thereon, and with feed hoses 48 connected to them. Note that some of chambers 46 are located inwardly of the peripheral chambers 46. Feed hoses 48 are also connected to these inner chambers 46. Also shown in FIG. 3 is a shaft 66, which is connected with carousel 44, so that rotation of shaft 66 rotates carousel 44, and vice versa.

Figure 4:
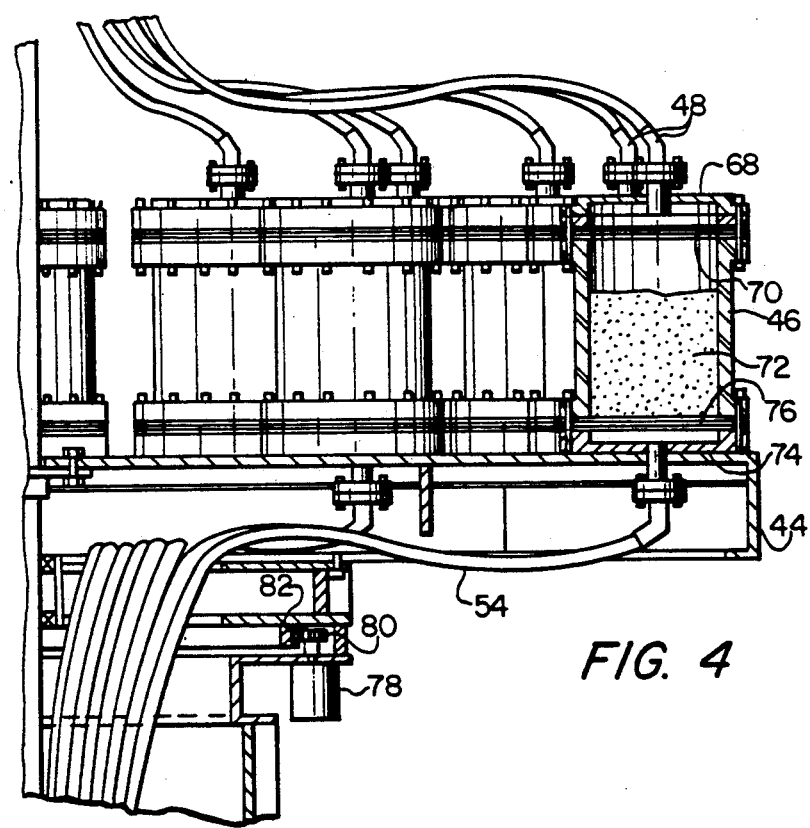
FIG. 4 is a cross-sectional view taken along line 4—4 of FIG. 3.

Referring to FIG. 4, there is shown a cross-section of carousel 44 and a chamber 46; chambers 46 are preferably made of high density polyethylene. Feed hoses 48 enter through the top 68 of chambers 46 and discharge feed liquid into the chamber 46, where it passes through an upper containment screen and support plate 70. Within chamber 46 there is a charge or body 72 of a strong cationic exchange resin, such as that hereinabove mentioned. Above the bottom 74 of chamber 46 is a support plate and a lower containment screen 76, upon which rests resin 72. Preferably, the screens are made of polypropylene, and the support plates are made of polyvinyl chloride, it is preferred that suitable gaskets be located between each of these separate parts wherever they are joined. A preferred gasket material is sold under the trade name Hypalon, and is sold with ASDs available from AST Inc. of Lakeland, Fla. Connected to bottom 74 of each chamber 46 are hoses 54. Also shown in FIG. 4 is a drive motor 78. Motor 78 drives a pinion 80, which is in mesh with a ring gear 82. As will be appreciated, rotation of carousel 44 may be effected by other mechanisms than that shown.

Figure 5:
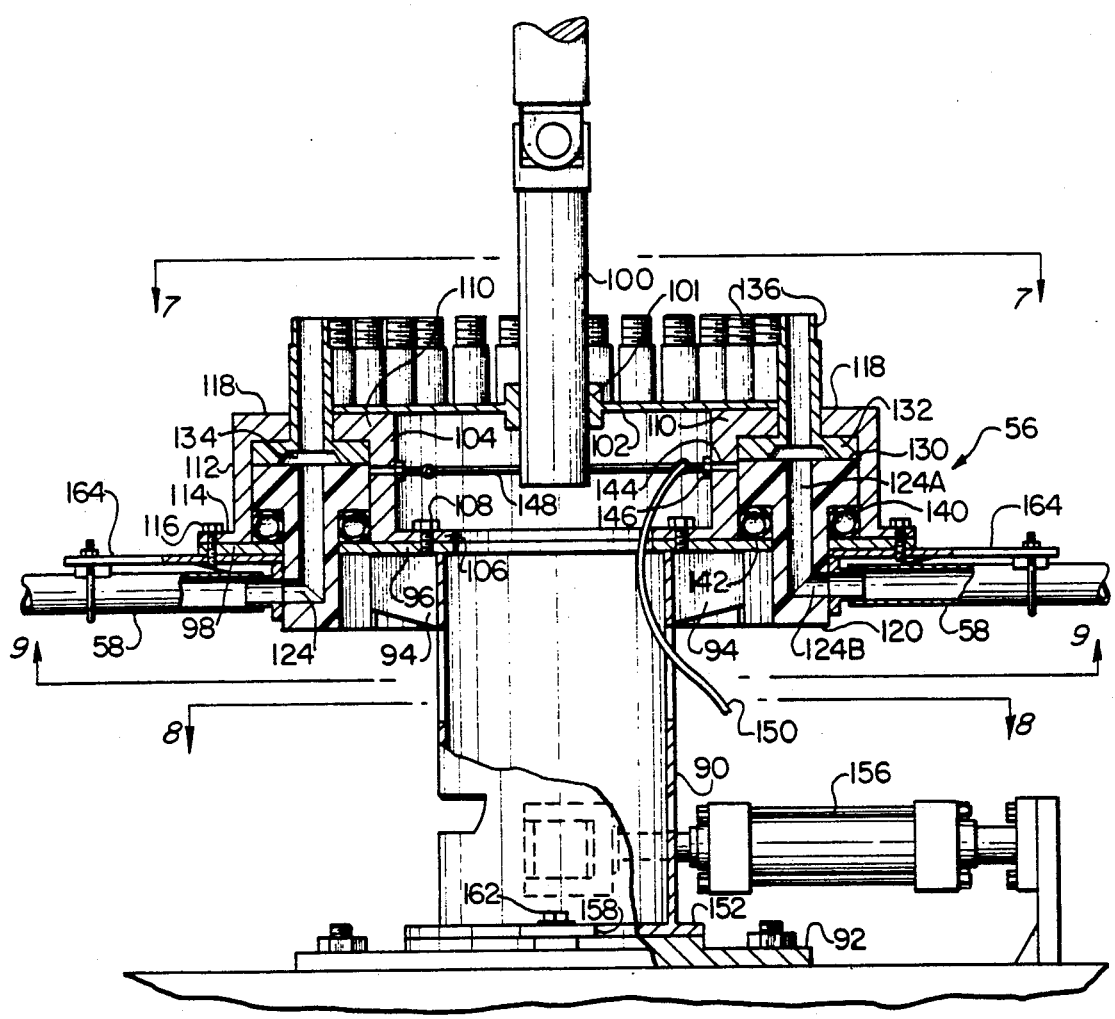
FIG. 5 is a cross-sectional view taken along line 5—5 of FIG. 2.
Figure 6:
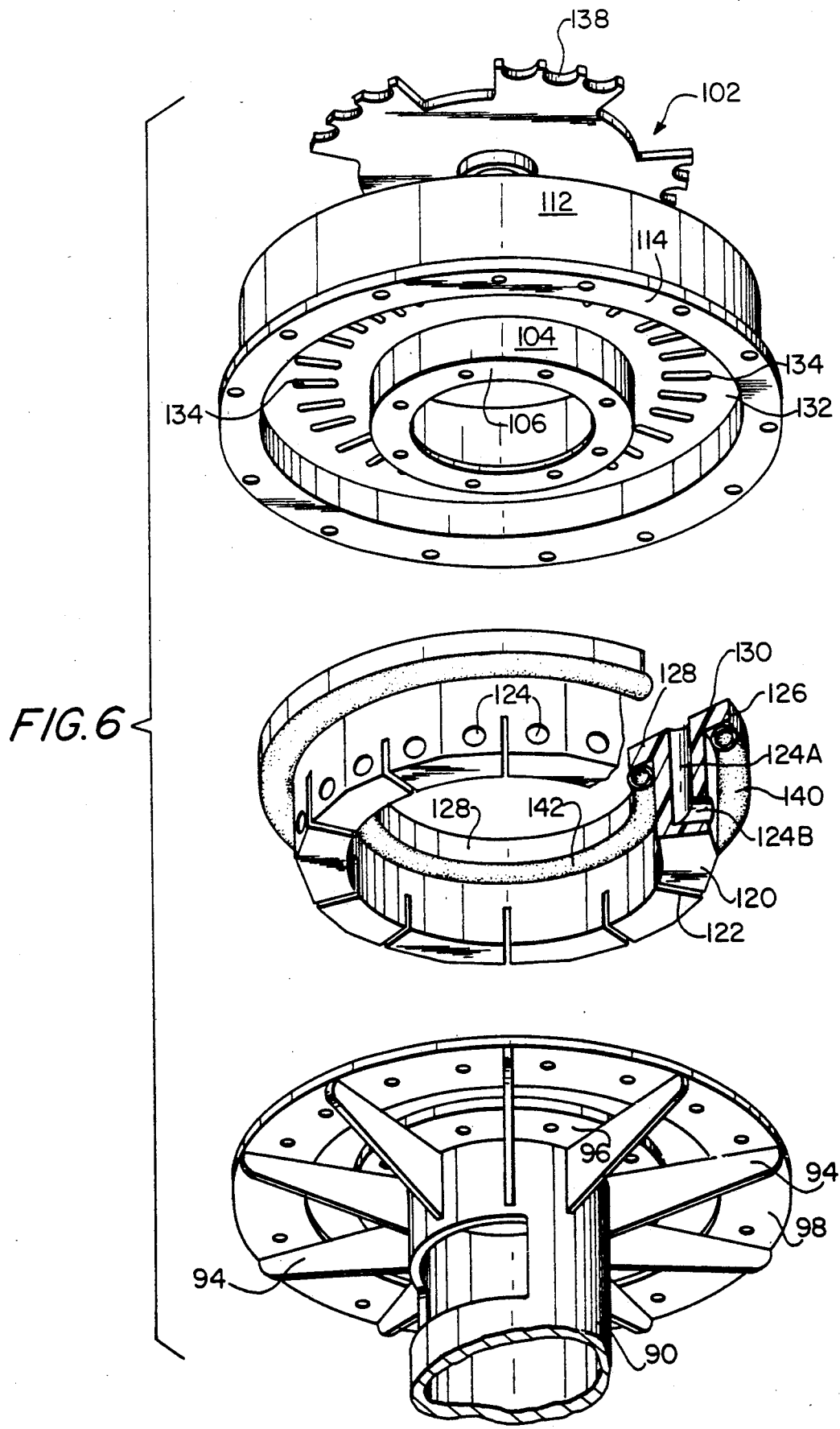
FIG. 6 is an exploded perspective view of parts of the apparatus shown in FIG. 5.

Referring now to FIG. 5, there is shown a cross-section of discharge distribution valve 56, it being understood that the construction of the feed distribution valve 50 is substantially the same, although valve 50 is positioned in apparatus 40 so as to be inverted with respect to valve 56. A pedestal 90, which is of hollow configuration as shown, rests on a base 92. At its upper end, pedestal 90 is provided with a series of radially extending abutment plates 94 (see also FIG. 6) and these support an inner annular plate 96 and an outer annular plate 98, there being an annular space between the plates 96 and 98 as shown in FIGS. 5 and 6.

Extending downwardly in alignment with the pedestal 90 is a drive shaft 100 having attached to it, as by a suitable keyway 101, a sprocket 102, located above the valve 56.

An inner valve housing ring 104 is provided with a lower, inwardly extending flange 106, and an annular series of bolts 108 secure flange 106 to the inner annular plate 96. Inner housing ring 104 is provided with an outwardly extending flange 110 at its upper end.

An outer housing ring 112 is concentric with inner housing ring 104 and has an outwardly extending flange 114 at its lower end; an annular series of bolts 116 secures the flange 114 to the outer annular plate 98. At its upper end, the outer housing ring 112 has an inwardly directed flange 118 which is in spaced, opposing relationship to the flange 110.

As shown in FIG. 6, there is provided an annular body 120 having a radial width substantially the same as the space between the inner annular plate 96 and the outer annular plate 98. The body 120 is provided with radially extending slots 122 which each receives one of the gusset plates 94. An annular series of L-shaped passages 124 are provided in the body 120, and the body 120 will be seen to have at its top an outwardly extending annular flange 126 and an inwardly extending annular flange 128. The vertical part 124A of the passage 124 extends to the upper surface 130 of the body 120; body 120 is, as shown FIG. 5, of T-shaped vertical cross-section.

On the upper surface 130 of body 120 there rests an annular crown plate 132. Crown plate 132 occupies the space above the body 120, and beneath the flanges 110 and 118 of the inner housing ring 104 and outer housing ring 112, respectively, and is between outer housing ring 112 and inner housing ring 104.

As shown in FIG. 6, the bottom surface of the annular crown plate 132 has an annular series of evenly spaced ports 134. These ports 134 are each in fluid communication with a nipple 136, which extends upwardly from the annular crown plate 132. The number of ports 134 and their circumferential extent are such that at any given moment, each of the ports 134 is in fluid communication with at least one of the L-shaped passages 124. In a preferred embodiment, the centers of thirty ports 134 are separated by 12° increments, so that twenty of the L-shaped passages 124, which are distributed at 18° intervals about the annular body 120, will always be in fluid communication with at least one of the ports 134.

Figure 7:
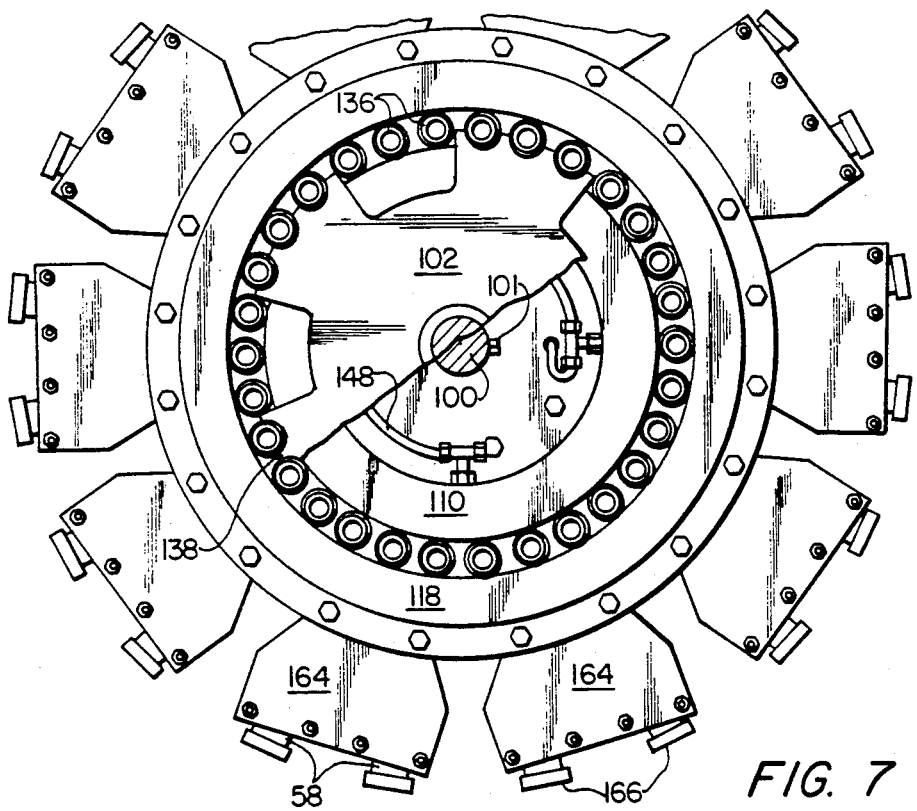
FIG. 7 is a cross-sectional view with parts broken away taken along line 7—7 of FIG. 5.

As shown in FIG. 7, the sprocket 102 has indentations 138 in its outer end which engage the nipples 136, in spaced groups of three, so as to drive the nipples 136 and the annular crown plate 132 inside of valve 56.

The lower, horizontal portions 124B of the L-shaped passages 124 are each in fluid communication with a hose 58. Hence, fluid may pass into or out of nipples 136 to or from hose 54, into or out of the port 134, thence into or out of passage 124 in the body 120, and thence outwardly or inwardly through hose 58.

To avoid leakage, as shown in FIG. 6, an annular outer bladder 140 underlies the flange 126, and an annular inner bladder 142 underlies the flange 128. The bladders 140 and 142 will be seen in FIG. 5 to substantially occupy the spaces between the inner annular plate 96, the outer annular plate 98, the inner housing ring 104, the outer housing ring 112, the vertical portion of body 120 and the flanges 126 and 128 of body 120. Pneumatic pressure is provided in bladders 140 and 142 to urge the upper surface 130 of body 120 against the lower surface of the annular crown plate 132. Should any leakage occur, it will be collected by a series of bores 144 extending through the inner housing ring 104, the bores being in fluid communication with nipples 146, which enable the bores 144 to be connected with a collection conduit 148, a drain conduit 150 being connected thereto.

Pneumatic pressure can be adjusted in bladders 140 and 142 to minimize wear of the valve component; suitable gauges and controls are preferably provided to monitor and adjust bladder pressure. If bladder pressure is too low, leakage from valves 50 and 56 will occur, and liquid will drain from conduits 150. Preferably, the inner bladders are maintained at 75 PSI pressure, and the outer bladders are maintained at 70 PSI, with maximum recommended pressures being 105 PSI and 100 PSI, respectively. Overinflation of the bladders will cause excessive torque to be required to rotate plate 132 in the valves 50 and 56. This could result in rupture of the bladders, faster wear of the valves, or damage to the motor and drive mechanism.

In a preferred embodiment, the drive mechanisms are protected by a high torque interlock, which will turn off the drive motor and nitric acid and potassium chloride feed solutions when excessive torque is encountered. Preferably, the speed controller for motor 78 is located inside the control apparatus 60. A preferred speed controller is sold under the name Speedstar JR; it is a variable frequency drive, available from Electrical South Inc. of Greensboro, N.C., and requires a 230 volt single phase power supply, converting input voltage to a 460 volt 3 phase output with a controlled frequency of 0–60 Hz.

Figure 8:
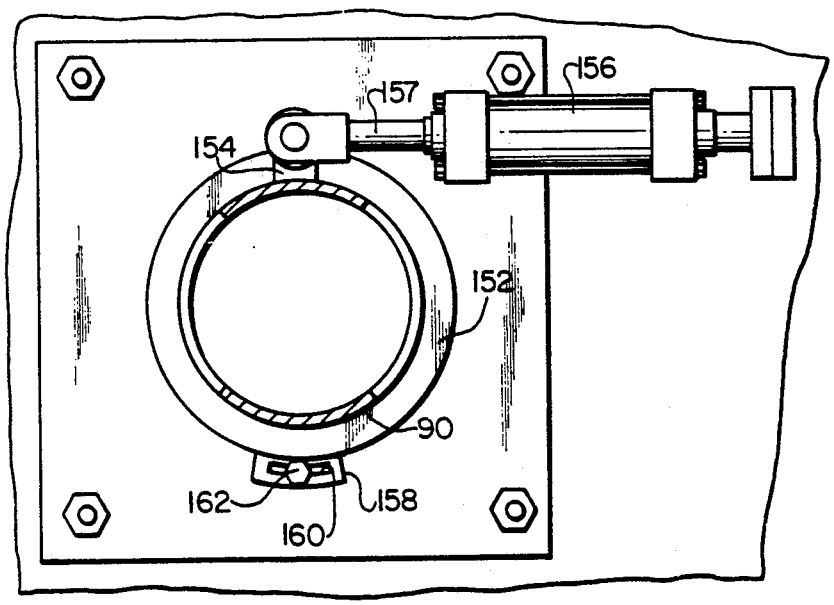
FIG. 8 is a cross-sectional view taken along line 8—8 of FIG. 5.

In FIGS. 5 and 8, there will be seen a base plate 152 for pedestal 90, which rests on the base 92. An ear 154 extends from pedestal 90, and is connected to a hydraulic pump and motor 156 through piston 157. A second ear 158, having a slot 160 therein, extends from the base plate 152, and a bolt 162 passes through the slot 160. Bolt 162 may be loosened to permit rotational movement of the pedestal 90 by the motor 156. This is effected in order to obtain adjustment of the valve 56, so that vertical parts 124A of passages 124 in valve 56 are vertically aligned with vertical parts 124A of passages 124 in valve 50. Thus, liquids travelling from a vertical part 124A in valve 50, through a chamber 46, and into the vertical part 124A in valve 56 which is in vertical alignment. The effect of this adjustment is to annularly displace the pedestal 90, body 120, inner housing ring 104 and outer housing ring 112.

In FIG. 7, there is shown the annular series of hoses 58, each pair of which is held by a support plate 164. There may be seen, also, the annular flange 118, the annular row of nipples 136, and inwardly thereof, the annular flange 110. There is also seen the sprocket 102 with indentations 138 engaging spaced groups of three nipples 136. Also shown is the collection conduit 148, and shaft 100.

Figure 9:
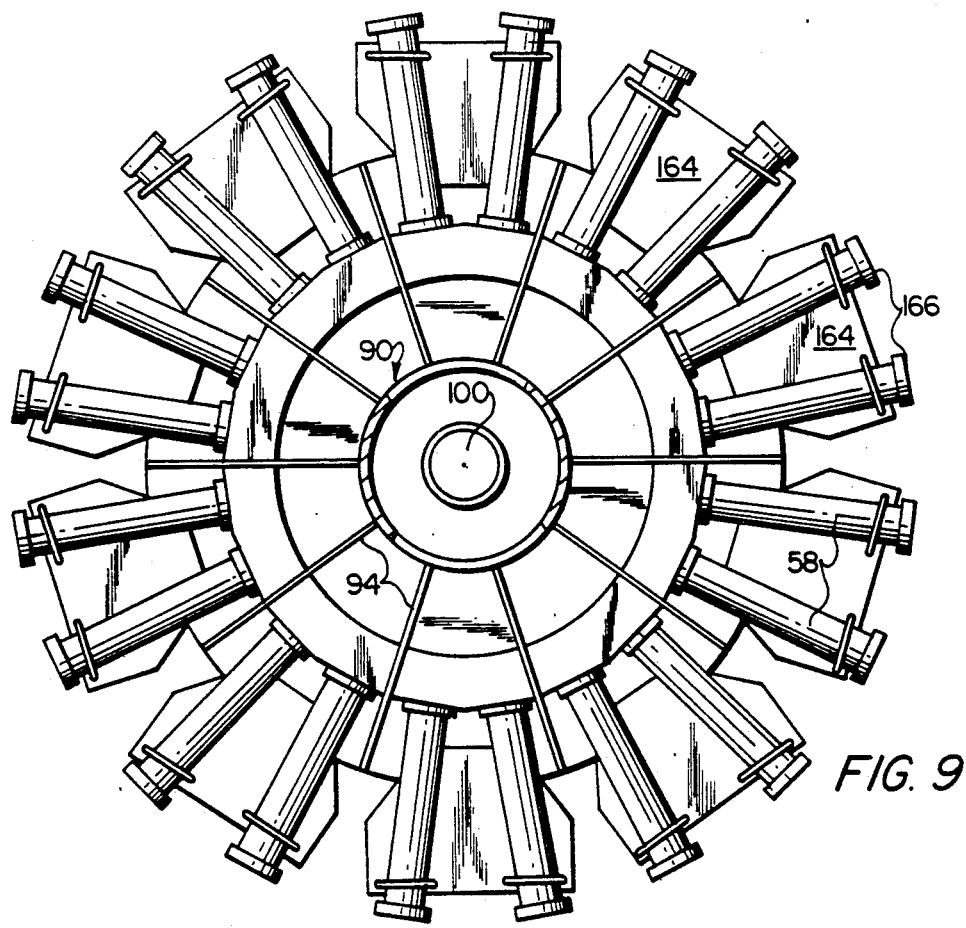
FIG. 9 is a cross-sectional view taken on line 9—9 of FIG. 5.

FIG. 9 discloses the plates 164, hoses 58, and the radially extending gusset plates 94 extending outwardly from the pedestal 90 Also shown is the shaft 100.

As noted above, valves 50 and 56 are substantially modified from previous ASD valves due to severe leakage problems encountered when using the prior art valves. Valves, such as 50 and 56 which include body 120 have superior leak resistance; this is due to the unitary construction of body 120, which is less likely to have its shape distorted by the rotation of crown plate 132. Further, slots 122 snugly fit over gusset plates 94 to prevent rotational slippage of body 120 in valves 50 and 56.

Hoses 58 are connected to the portion of body 120 which projects from between inner and outer annular plates 96 and 98. In order to reduce the possible flexing or bending of the projecting portion of body 120 upon connection of hoses 58 to the horizontal part 124B of L-shaped passages 124, hoses 58 are preferably permanently attached to passages 124, and reinforced with plates 164. Quick release connectors 166 enable rapid connection and disconnection of extensions of hoses 58 without stressing body 120, thereby resulting in a surprisingly improved leak resistant valve construction.

This valve construction allows for large scale industrial production of the potassium nitrate through continuous contact with strong cationic exchange resin without leakage of nitric acid feed solution or hydrochloric acid discharge solution.

Preferably, body 120 is molded from a solid plastic, which is capable of resisting corrosion by the process reactants and products. A preferred material for forming body 120 is high density polyethylene. Stainless steel is known to resist nitric acid, but hydrochloric acid produced in the process is known to corrode stainless steel. Therefore, in a preferred embodiment, rotating crown plate 132 is formed of an alloy sold under the trade name Hastelloy "C22", sold with ASDs available from AST Inc. of Lakeland, Fla. Other materials may be used, but may wear out faster. The bearings and other parts of valves 50 and 56 are preferably formed of polypropylene, and chlorinated polyvinyl chloride.

Preferably, DOWEX MONOSPHERE TG650C strong cation exchange resin is used, which has a particle size of 20-40 U.S. Standard Mesh. Preferably, chambers 46 are sufficiently large to hold a charge of 4.55 cubic meters of resin, and have enough space to allow for resin expansion. The perforated resin support plate preferably has a 60 U.S. Standard Mesh screen thereon to contain the resin in the chambers. Note that, while the DOWEX MONOSPHERE TG650C resin is preferred, any other strong cation exchange resin capable of producing potassium nitrate upon contact with nitric acid solution, is contemplated as being equivalent. Although individual chambers are used in a preferred embodiment, a large single chamber, divided into compartments, may be used in place of the separate chambers. Further, the number of compartments and feed ports may be changed. The preferred chambers are 61 cm in diameter, having a resin bed depth of 61 cm, and allow for resin expansion of 15 cm.

As one of skill in the art will readily appreciate, a variety of procedures can be followed to optimize operational parameters for apparatus 40. Further, a variety of modifications can be made to the apparatus to help ensure that the apparatus is set up for and maintained at peak efficiency.

In a preferred embodiment, valves 50 and 56 are kept in the same relative rotational positions with each other, in order to keep the zones of valve 50 synchronized with the zones of valve 56; misalignment of the valves may cause cross-leakage in the system. Therefore, it is preferred that an alignment device (not shown) be utilized to assist in the alignment of the valves 50 and 56. For example, in order to keep the fixed vertical passages 124A of valves 50 and 56 in vertical alignment, alignment indicator lights are preferably provided to assist in monitoring valve alignment. Attached to valves 50 and 56, on crown plate 132, are fixed two magnetic pick-ups spaced at 180°, which activate a sensor located on the fixed component of the valve. The sensors transmit a signal to the indicator lights when they are in alignment with the magnetic pick-ups. When the valves 50 and 56 are in perfect alignment, the indicator lights for the upper and lower valves will light simultaneously. If the valves are out of alignment, the lights will not be activated simultaneously.

In order to adjust alignment of the valves, the necessary connections, such as bolt 162, are loosened, and pedestal 90, along with the components of valve 56 attached thereto, is rotated to align the vertical parts 124A of passages 124 in valve 56 with their corresponding parts in valve 50. Close vertical alignment of valves 50 and 56 is generally preferred for a carousel rotation rate of approximately fifty minutes to one hour per rotation; faster carousel rotation rates may require that vertical parts 124 in lower valve 56 lead the corresponding parts in valve 50. As one of skill in the art can appreciate, the rotation rate of the carousel can be greatly increased or reduced depending upon solution flow rates and other process requirements in order to optimize the performance of apparatus 40.

Figure 10:
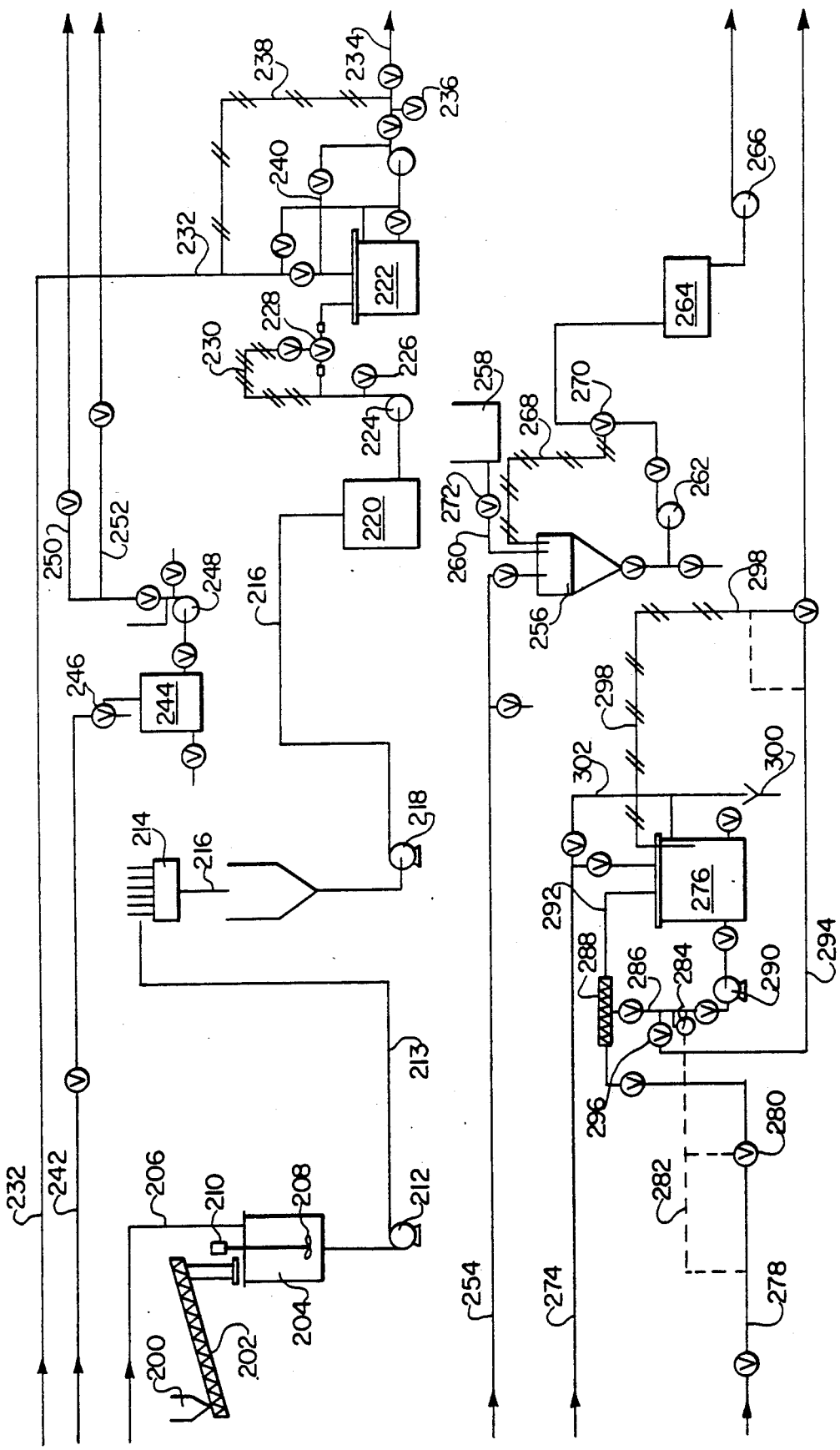
FIG. 10 illustrates a plant layout for performing the preferred embodiment of the present process.

With reference to FIG. 10, a preferred plant layout is illustrated, which uses an apparatus, such as apparatus 40, to continuously produce potassium nitrate via contact of nitric acid with a strong cationic exchange resin. Solid potassium chloride is fed to hopper 200 where conveyor 202 directs them to a dissolution vessel 204. Solid potassium chloride is combined with water from line 206 in vessel 204, and stirred by an agitator 208, which is driven by motor 210. Pump 212 directs the concentrated potassium chloride solution to filter 214.

Preferably, the concentrated KCl solution in line 213 contains about twenty per cent potassium chloride by weight. The filtered potassium chloride solution in line 216 is then transferred by pump 218 to surge tank 220. Potassium chloride solution in tank 220 is then directed to a potassium chloride feed tank 222 by pump 224. A sample point 226 enables samples to be drawn from potassium chloride solution line 216, so that its concentration and purity can be monitored. A control valve 228 regulates the amount of potassium chloride solution in line 216 being fed to tank 222. A control loop 230 is provided, and preferably includes a flow indicator quantity totalizer, a transducer to convert pneumatic signals to electronic signals, and a separate flow control which uses pneumatic pressure to regulate control valve 228.

Potassium chloride solution 216 is diluted in tank 222 through combination with adsorption wash effluent in line 232. Preferably, potassium chloride feed solution in line 234 is directed from tank 222 to ports 6 and 7 of the potassium adsorption zone in FIG. 11. Note that adsorption wash effluent 232 contains dilute potassium chloride and very dilute hydrochloric acid. Preferably, the potassium chloride feed solution in line 234 contains approximately twelve per cent potassium chloride by weight. As will be appreciated by one of skill in the art, potassium chloride solutions of greater and lesser concentration may be used.

A sample point 236 is provided to withdraw samples, and a separate pneumatic control loop 238, having similar parts and configuration to loop 230, is provided to control a solution recirculation loop 240; this ensures that a homogenous potassium chloride solution, having a stable concentration, is directed to apparatus 40.

Fresh deionized water is fed through line 242, and is stored in a wash water tank 244. Preferably, tank 244 holds approximately 1300 gallons of water for a plant which produces approximately 5000 tons or more of potassium nitrate per year, and a sufficient quantity of water is maintained in the tank through use of a float valve 246. Wash water is then directed by pump 248 to lines 250 and 252. Line 250 directs water to the potassium adsorption wash zone which initiates at port 2 in FIG. 11. Line 252 directs water to a potassium nitrate production wash zone initiated at port 13 in FIG. 11.

Figure 11:
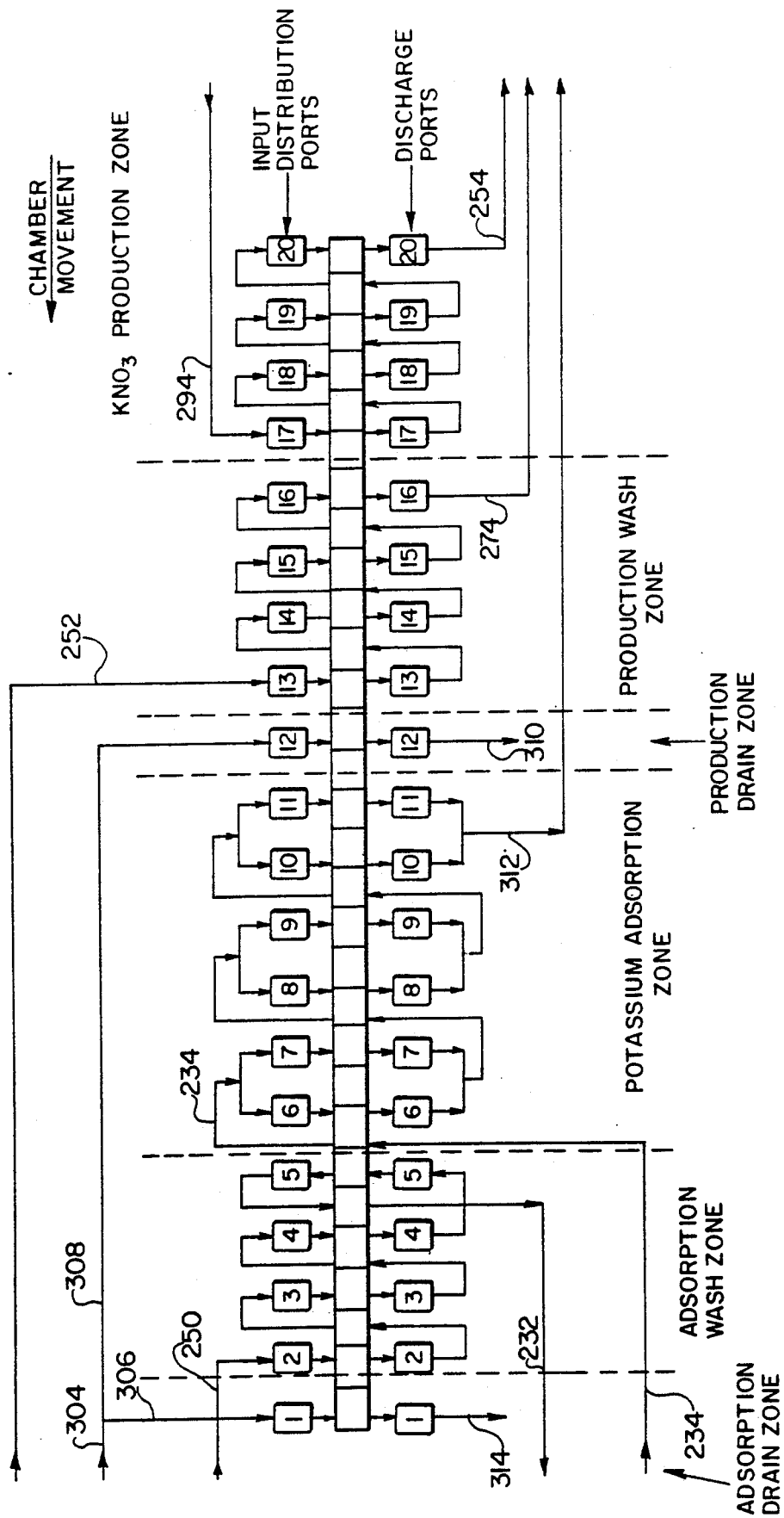
FIG. 11 is a schematic view illustrating a process for producing potassium nitrate using the apparatus of FIG. 2.

Line 254 carries a solution of potassium nitrate produced in apparatus 40 from port 20 in FIG. 11 where it is directed to a surge tank 256. Potassium hydroxide is stored in tank 258 and pumped through line 260 to tank 256, where it is used to neutralize residual nitric acid in the potassium nitrate solution. Pump 262 directs neutralized potassium nitrate solution (the reaction of potassium hydroxide and nitric acid yielding a solution of potassium nitrate only), to a storage or surge tank 264. Preferably, pump 266 then directs the potassium nitrate solution to a subsequent crystallization procedure. A pneumatic control loop 268 regulates valve 270 and valve 272 to ensure that the proper amount of potassium hydroxide solution from tank 258 is added to tank 256.

Line 274 carries production wash effluent from port 16, and directs it to tank 276 where it is combined with concentrated nitric acid from line 278. Flow of nitric acid in line 278 is regulated by control valve 280 which interacts with control loop 282. A density meter 284 interacts with control loop 282 for a purpose to be described below.

Nitric acid in line 278 is combined with a mixture of nitric acid and production wash water from tank 276, which is provided by line 286 in static mixer 288. Pump 290 circulates solution from tank 276 through line 286, through static mixer 288, and into line 292 to ensure that a homogenous nitric acid solution is directed into line 294. Density meter 284 measures the density of the nitric acid solution passing through line 286, and interacts with control loop 282 to thereby control the amount of solution flowing through lines 278, 286, 292 and 294.

Control loop 298 monitors and adjusts for the volume of nitric acid solution in tank 276. Excess production wash effluent in line 274 is directed to a drain 300 by line 302. The production wash effluent in line 274 contains very dilute nitric acid and potassium nitrate. Preferably, the concentrated nitric acid is provided as a fifty-two per cent by weight solution and is diluted in tank 276 to an approximately twelve per cent by weight solution. Nitric acid in line 294 is then directed to port 17 of the potassium nitrate production zone in FIG. 11.

The reaction is generally carried out at ambient temperatures, although some increase in temperature is noted in static mixer 288 as a result of diluting the nitric acid. Preferably, the temperature does not increase beyond about 110° F. in static mixer 288.

In a preferred embodiment, tanks 222 and 276 are formed of a plastic material such as those sold under the name Nalgene. Preferably, feed lines are formed of two inch diameter polyvinyl chloride piping, although any other material or size tubing or piping may be used, provided it does not interfere substantially with the reaction process. The electropneumatic control loops can be replaced with other mechanisms capable of automatically monitoring and adjusting solution concentrations and flow, or the system can be run manually, although the later alternative is inefficient in comparison with automatic systems. A wash system (not shown) is preferably provided to periodically rinse off apparatus 40.

With particular reference to FIG. 11, note that line 304 provides compressed air to ports 1 and 12 via lines 306 and 308, respectively (Please note that the numbers given to the ports is arbitrary). Nitric acid entering fixed feed port 17 passes into one or two chambers which are moving slowly into and out of periodic fluid communication with port 17. The solution of nitric acid contacts potassium loaded strong cation exchange resin in the chambers to produce a solution of potassium nitrate, while reducing the concentration of nitric acid. The solution of potassium nitrate and nitric acid flows out of the chambers in fluid communication with input port 17 into discharge port 17, and is sequentially directed to feed and discharge ports 18, 19 and 20.

As the nitric acid solution passes countercurrently to the chamber movement through ports 17 through 20, the concentration of nitric acid is reduced, while the concentration of potassium nitrate in the solution is increased. Thus, freshly regenerated potassium loaded strong cation exchange resin in the chambers moving into and out of fluid communication with ports 20 is contacted with a solution having a relatively high concentration of potassium nitrate and a low concentration of nitric acid.

Chambers passing from the potassium nitrate production zone pass to a production wash zone. Deionized water in line 252 is passed countercurrent to the chamber movement sequentially through ports 13 through 16. The effluent from discharge port 16 in line 274 contains dilute potassium nitrate and very dilute nitric acid which is then directed to tank 276 where it is combined with concentrated nitric acid from line 278. Thus, nitric acid in line 294 will generally contain small quantities of potassium nitrate. Chambers passing from the production wash zone pass into fluid communication with air from line 308 through port 12 in a production drain zone. Air from line 308 forces residual potassium nitrate and nitric acid into discharge port 12 where it is subsequently disposed of from drain line 310.

Chambers passing from fluid communication with port 12 pass into a potassium adsorption zone, in which the hydrogen loaded resin formed in the potassium nitrate production zone is regenerated to its potassium loaded form. A potassium chloride solution in line 234 is directed into ports 6 and 7, and discharges through discharge ports 6 and 7. The solution discharging from discharge ports 6 and 7 is preferably combined, and is then directed to feed ports 8 and 9. Preferably, the solution discharging from ports 8 and 9 is combined, and fed to input ports 10 and 11. The concentration of potassium chloride in the solution decreases as the potassium chloride solution passes through the chambers in the potassium adsorption zone towards the production drain zone. The adsorption of potassium on the hydrogen loaded resin results in the formation of hydrochloric acid which ultimately discharges from ports 10 and 11 into discharge line 312. Preferably, the hydrochloric acid is utilized in other chemical processes, or is neutralized before disposal.

Chambers passing from the potassium adsorption zone then move to the adsorption wash zone where excess potassium chloride and hydrochloric acid are rinsed from the potassium loaded cation exchange resin. Note that wash water from line 250 passes countercurrently to the direction of chamber movement through ports 2 to ports 5. Generally, feed solutions are passed downwardly through the resin filled chambers. However, it is preferred that at least one feed solution be directed upward through the chamber in order to redistribute the resin in the chamber. This avoids channelling and other negative chromatographic separation effects.

Note that the adsorption wash feed is preferably fed upwardly through discharge port 5 and feed port 5. The adsorption wash zone effluent enters line 232, where it is subsequently used to dilute potassium chloride feed solution in tank 222. Chambers moving from the adsorption wash zone then pass into fluid communication with feed port 1, where air from line 306 forces the residual solution of dilute potassium chloride and hydrochloric acid into discharge port 1; the dilute solution is then neutralized and sent to a sewer through line 314.

While twenty input ports and twenty discharge ports have been utilized in conjunction with thirty rotating chambers, it is contemplated that the various production zones represented in FIG. 11 can be formed with as few as one input and discharge port for each zone, although this will require some modification of the valves. It follows that the number of chambers may be increased or decreased, or that multiple chambers may be replaced with a single chamber divided into a plurality of compartments.

EXAMPLE 1

The following non-limiting example provides an actual material balance for a potassium nitrate production plant using an apparatus such as described above. Other methods, materials, and reactions parameters than those described above or below can be used in the practice or testing of the present invention. Table 1 below presents material input and output data for an ASD, such as described above, having thirty chambers filled with a strong cation exchange resin (DOWEX MONOSPHERE TG650C), which periodically rotate into and out of fluid communication with twenty vertically aligned feed and discharge ports; the solution flow pattern represented in FIG. 11 was followed.

TABLE 1

| | FLOW (GPM) | TOTAL WT. (LBS/MIN.) | KNO3 (LBS/MIN.) | HNO3 (LBS/MIN.) | KCL (LBS/MIN.) | HCL (LBS/MIN.) | H2O (LBS/MIN.) |
|---|---|---|---|---|---|---|---|
| ABSORPTION WASH WATER FEED | 34.32 | 286.34 | — | — | — | — | 286.34 |
| ABSORPTION WASH WATER DISCHARGE | 27.60 | 230.29 | — | — | 2.90 | 0.06 | 227.34 |
| KCL SOLUTION (20% BY WT) | 12.32 | 115.64 | — | — | 23.13 | — | 92.51 |
| ABSORPTION ZONE FEED | 39.92 | 345.93 | — | — | 41.51 | 0.69 | 303.73 |
| ABSORPTION ZONE DISCHARGE (HCL EFFLUENT) | 28.96 | 248.90 | — | — | 4.73 | 8.71 | 235.46 |
| PRODUCTION WASH WATER FEED | 24.20 | 201.91 | — | — | — | — | 201.91 |
| PRODUCTION WASH WATER DISCHARGE | 19.97 | 166.57 | 2.83 | 5.83 | — | — | 157.91 |
| NITRIC ACID (52% BY WT) | 2.86 | 31.26 | — | 16.25 | — | — | 15.00 |
| PRODUCTION ZONE FEED | 22.83 | 197.83 | 2.97 | 26.71 | — | — | 168.16 |
| KNO3 PRODUCT | 14.27 | 135.10 | 24.32 | 1.15 | — | — | 109.63 |
| ABSORPTION ZONE DRAIN | 16.81 | 140.23 | — | — | — | — | 140.23 |
| PRODUCTION ZONE DRAIN | 13.27 | 110.68 | — | — | — | — | 110.68 |

| | KNO3 (MTPD) | HNO3 (MTPD) | KCL (MTPD) | HCL (MTPD) | H2O (MTPD) |
|---|---|---|---|---|---|
| ABSORPTION WASH WATER FEED | — | — | — | — | 187.20 |
| ABSORPTION WASH WATER DISCHARGE | — | — | — | — | — |
| KCL SOLUTION (20% BY WT) | — | — | 15.12 | — | 60.48 |
| ABSORPTION ZONE FEED | — | — | — | — | — |
| ABSORPTION ZONE DISCHARGE (HCL EFFLUENT) | — | — | 3.09 | 5.70 | 153.93 |
| PRODUCTION WASH WATER FEED | — | — | — | — | 132.00 |
| PRODUCTION WASH WATER DISCHARGE | — | — | — | — | — |
| NITRIC ACID (52% BY WT) | — | 10.63 | — | — | 9.81 |
| PRODUCTION ZONE FEED | — | — | — | — | — |
| KNO3 PRODUCT | 15.9 | 0.75 | — | — | 71.67 |
| ABSORPTION ZONE DRAIN | — | — | 0.0275 | 0.0034 | 91.65 |
| PRODUCTION ZONE DRAIN | 0.0068 | 0.0087 | — | — | 72.34 |

GPM - Gallons per Minute
LBS/MIN - Pounds per Minute
MTPD - Metric Tons per Day

Of particular significance in Table 1 is the row labled "KNO3 PRODUCT," showing that 15.9 metric tons per day of potassium nitrate were produced, with only 0.0068 metric tons per day being lost from the production drain zone. This quantity of potassium nitrate was produced from 15.12 metric tons per day of potassium chloride and 10.63 metric tons per day of nitric acid. This represents approximately a ninety-three per cent conversion of the nitric acid to potassium nitrate, with only a 0.1 per cent loss of nitric acid through the production drain zone. The remaining seven per cent nitric acid was subsequently neutralized with potassium hydroxide.

Although the resin utilized in Example 1 lost some of its color, no decrease in resin loading capacity was noted. Further, close examination of the resin beads continuously used for six months showed the beads to have maintained good sphericity and strength. Thus, it appears that the resin may be used for long periods of time without any substantial loss in its ability to reversibly exchange potassium and hydrogen.

Please note that by adjusting the concentration and flow rates of the various feed solutions, altering the amount of resin in the chambers, and adjusting the rotation rate of the carousel, that higher percentage conversion of nitric acid to potassium nitrate may be obtained.

It is contemplated that the process described hereinabove is equivalent to processes in which the potassium nitrate production zones, production wash zone, and production drain zones are not stationary, and the resin filled chambers are stationary, such that the feed and discharge ports are moved into and out of fluid communication with the stationary resin filled chambers. It is also contemplated that the continuous ion exchange process of the present invention can be performed by other apparatus, in which a plurality of stationary chambers or columns, filled with a strong cation exchange resin, are sequentially fed solutions of potassium chloride, wash water, nitric acid solution, and wash water solution, with air being injected into the columns following the adsorption wash and production wash solutions. There can be provided sufficient columns and control apparatus so that there are at least six columns, with each of the six columns undergoing a different step of the process than the other columns simultaneously. In this way, continuous production of potassium nitrate from potassium chloride and nitric acid could also be produced.

Thus, it has been discovered that potassium nitrate can be easily and safely produced by contacting a solution of nitric acid with the potassium loaded strong cation exchange resin. It is further possible to achieved high efficiency of this reaction with minimal resin volume through the use of a continuous solid liquid contacting apparatus, such as, but not limited to, that described above.

From the above teachings, it is apparent that many modifications and variations of the present invention are possible. It is therefore to be understood that the invention may be practiced otherwise than as specifically described.

I claim:

1. A process for the continuous production of $KNO_3$ via ion exchange, comprising the steps of:
   a) continuously passing a first solution comprising $HNO_3$ through a first group of at least one potassium loaded strong cationic exchange resin bed to continuously produce a second solution comprising $KNO_3$ and converting at least a portion of said resin to the hydrogen loaded form;
   b) continuously passing a third solution comprising water through a second group of at least one resin bed having at least a portion of said resin in the hydrogen loaded form, said at least one bed also containing $HNO_3$ and $KNO_3$ formed in step a), to continuously form a fourth solution comprising $HNO_3$ and $KNO_3$;
   c) continuously passing a fifth solution comprising KCl through a third group of at least one resin bed having at least a portion of said resin in the hydrogenated form to continuously produce a sixth solution comprising HCl and converting at least a portion of said resin to the potassium loaded form;
   d) continuously passing a seventh solution comprising water through a fourth group of at least one resin bed having at least a portion of said resin in the potassium loaded form, said at least one bed also containing HCl and KCl formed in step c), to continuously form an eighth solution comprising HCl and KCl; wherein
   said steps a, b, c, and d are performed simultaneously;
   said first, third, fifth and seventh solutions are continuously fed to said beds through feed ports in fluid communication with said beds;
   said second, fourth, sixth and eighth solutions are continuously drained from drain ports in fluid communication with said beds;
   said process further comprising simultaneously effecting relative movement between said beds and said ports so that said each of said first group of beds sequentially becomes a member of said second, third, fourth and first group of beds, each of said second group of beds sequentially becomes a member of said third, fourth, first and second group of beds, each of said third group of beds sequentially becomes a member of said fourth, first, second, and third group of beds, and each of said fourth group of beds sequentially becomes a member of said first, second, third, and fourth group of beds.

2. A process according to claim 1, wherein:
   said fourth solution is combined with a ninth solution to form said first solution, said ninth solution comprising water and $HNO_3$; and
   said sixth solution is combined with a tenth solution to form said fifth solution, said tenth solution comprising water and KCl.

3. A process according to claim 1, wherein:
   said resin beds are all approximately equal in size;
   said first group of beds comprises at least two beds arranged in series, wherein said second solution formed in a first bed of said first group is fed to a second bed, the concentration of $KNO_3$ in said second solution gradually increasing while passing through said second bed and any subsequent beds in said first group; and
   said third group of beds comprises at least two sets of two beds arranged in parallel, said sets of parallel beds being arranged sequentially, so said fifth solution is continuously and simultaneously fed to a first set of two beds in said third group, and said sixth solution obtained from said first set of beds is simultaneously and continuously fed to a second set of two beds in said third group, the concentration of said HCl in said sixth solution gradually increasing while passing through said second set of beds and any subsequent sets of beds in said third group.

4. A process according to claim 1, further comprising the steps of:
   e) continuously passing air though a fifth group of at least one resin bed containing said fourth solution to cause at least a portion of said fourth solution to drain from at least one bed of said fifth group;
   f) continuously passing air through a sixth group of at least one resin bed containing said eighth solution to cause at least a portion of said eighth solution to drain from at least one bed of said sixth group; wherein:
   said air is continuously fed to said fifth and sixth group of beds through feed ports in fluid communication with said fifth and sixth group of beds;
   said fourth and eight solutions draining from said beds are drained from drain ports in fluid communication with said fifth and sixth group of beds;
   said second group of beds sequentially become said fifth group of beds prior to becoming said third group of beds; and said fourth group of beds sequentially become said sixth group of beds prior to becoming said first group of beds.

5. A process according to claim 1, wherein at least about 85% of said $HNO_3$ in said first solution reacts with said resin to form said $KNO_3$.

6. A process according to claim 1, wherein:
said steps a, b, c, and d are performed at ambient temperatures; and
said second solution comprises more than about 14% by weight of said $KNO_3$, and less than about 1.0% by weight of said $HNO_3$.

7. A process according to claim 1, wherein:
said strong cationic exchange resin comprises a sulfonated styrene-divinylbenzene copolymer; and
the concentration of said nitric acid in said first solution is up to about 23% by weight.

8. A process according to claim 3, wherein:
each of said beds is placed in fluid communication with no more than one feed port at a time, and each of said feed ports is placed in fluid communication with at least one bed.

9. A process according to claim 8, wherein:
said first solution is continuously fed through a first feed port in fluid communication with at least one of said first group of beds, and said second solution is continuously drained from a first drain port in fluid communication with said first feed port through said at least one of said first group of beds;
said second solution is sequentially and continuously fed to and drained from second, third and fourth feed and drain ports in fluid communication with at least three other beds of the first group of beds, the direction of said flow of said first and second solutions being countercurrent to the relative direction of motion of said beds with respect to said ports.

10. A process according to claim 9, wherein:
said solutions are continuously fed and drained through twenty feed ports and twenty drain ports, each of said feed ports being in fluid communication with one of said drain ports, and each of said feed ports being sequentially placed in fluid communication with thirty beds.

11. A process according to claim 1, wherein:
said process is capable of producing at least 15.9 metric tons of $KNO_3$ from about 10.6 metric tons of $HNO_3$.

12. A process according to claim 11, wherein:
said process is capable of producing said at least 15.9 metric tons of $KNO_3$ in about 24 hours from said about 10.6 metric tons $HNO_3$ when said resin beds contain a combined total of at least about 4.5 cubic meters of said resin.

13. A process according to claim 10, wherein:
said process is capable of producing at least 15.9 metric tons of $KNO_3$ from about 10.6 metric tons of $HNO_3$.

14. A process according to claim 13, wherein:
said process is capable of producing said at least 15.9 metric tons of $KNO_3$ in about 24 hours from said about 10.6 metric tons $HNO_3$ when said resin beds contain a combined total of at least about 4.5 cubic meters of said resin.

* * * * *